United States Patent
Tebbe et al.

(10) Patent No.: US 10,277,314 B2
(45) Date of Patent: Apr. 30, 2019

(54) DEVICES AND METHODS FOR ESTIMATING RECEIVED SIGNAL STRENGTHS IN PASSIVE OPTICAL NETWORKS ON A BURST-BY-BURST BASIS

(71) Applicant: Nokia Solutions and Networks OY, Espoo (FI)

(72) Inventors: Roy B Tebbe, Raleigh, NC (US); Kaleb Q Droskiewicz, Raleigh, NC (US); Bradley L Mendenhall, Raleigh, NC (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 15/700,170

(22) Filed: Sep. 10, 2017

(65) Prior Publication Data

US 2019/0081700 A1   Mar. 14, 2019

(51) Int. Cl.
H04J 14/08 (2006.01)
H04B 10/079 (2013.01)
H04B 10/27 (2013.01)

(52) U.S. Cl.
CPC ....... *H04B 10/07953* (2013.01); *H04B 10/27* (2013.01)

(58) Field of Classification Search
CPC .... H04B 10/071; H04B 10/0775; H04J 14/08
See application file for complete search history.

(56) References Cited

U.S. PATENT DOCUMENTS

| | | | |
|---|---|---|---|
| 2011/0255866 A1* | 10/2011 | Van Veen | H04B 10/07955 398/35 |
| 2013/0279905 A1* | 10/2013 | Brown | H03K 5/1252 398/37 |
| 2015/0163010 A1* | 6/2015 | Umeda | H04B 10/272 398/98 |
| 2017/0078021 A1* | 3/2017 | Zhang | H04B 10/2504 |
| 2017/0201319 A1* | 7/2017 | Soto | H04B 10/071 |
| 2018/0167927 A1* | 6/2018 | Beattie, Jr. | H04W 4/029 |

* cited by examiner

*Primary Examiner* — Dzung D Tran
(74) *Attorney, Agent, or Firm* — Capitol Patent & Trademark Law Firm, PLLC

(57) ABSTRACT

The received signal strength of individual optical data bursts may be estimated based on the detection of bit patterns within each data burst associated with an amplifier recovery time period. The burst-by-burst estimates can be made faster than existing techniques.

20 Claims, 4 Drawing Sheets

DEVICES AND METHODS FOR ESTIMATING RECEIVED SIGNAL STRENGTHS IN PASSIVE OPTICAL NETWORKS ON A BURST-BY-BURST BASIS

RELATED APPLICATION

This application is related to U.S. patent application Ser. No. 15/606,094, filed May 26, 2017 (the "'094 Application"), the contents of which are incorporated by reference herein as if set forth in full herein. To the extent that anything in the '094 Application conflicts with the disclosure of the present application, the disclosure of the present application shall govern.

INTRODUCTION

Monitoring the received signal strength of optical signals sent from optical network units (ONUs) within a passive optical network (PON) provides the operator of the PON with information about the ONUs and the PON's infrastructure (e.g., optical cables, fibers) so that the operator may predict, avoid or correct problems in order to maintain an acceptable level of service to the end users who are ultimately served by the ONUs.

In a PON, a received signal strength may be determined by an optical line terminal (OLT) that is typically, but not exclusively, located at a centralized location in the PON with respect to a number of ONUs that are also within the PON. The direction from the ONUs to the OLT is typically referred to as the "upstream" direction in a PON. The opposite or "downstream" direction is operated in continuous mode, where the laser within an OLT is always on. For the upstream direction, the ONUs operate in a burst mode where each ONU laser only turns on for the duration of its assigned timeslot and outputs a burst of data (i.e., a data burst).

In more detail, in existing PONs, to determine the signal strength of an upstream data burst in an upstream path that comprises an ONU and its link to an OLT, the OLT is typically physically connected to an optical fiber (or fibers, as the case may be, making up an optical trunk or cable). More particularly, an optical module that is part of the OLT is connected to the optical fiber trunk. Within the optical module is a so-called "trigger pin" that is dedicated to the detection of received signal strengths.

In existing systems, the trigger pin is activated to begin a measurement of the received signal strength of an individual upstream optical data burst. Typically, circuitry that may be part of an optics module within the OLT converts the received signal measured after activation of the dedicated trigger pin into a signal that can be used to compute an average signal strength level (in dBm for example). Traditionally, this process is relatively slow, being limited to 1 measurement every 500 uS or longer because, for example, of the time it takes to perform analog to digital conversions after a dedicated trigger pin has been activated, and the time it takes to read resulting measurements from the circuitry via a serial interface, such as an Inter-Integrated Circuit (I2C) electronic bus. Thus, for a PON that is responsible for communicating with (and making signal strength measurements from) 32 ONUs, for example, the signal strength of each ONU can typically be computed only once every 16 ms, assuming no other activity on the I2C bus. For certain applications such as upstream power leveling, or wavelength tuning, this is undesirable. In addition, optical modules that include multiple ports have been recently introduced or are planned for introduction. To compute signal strengths for such modules using existing techniques would require an independent pin for each port to be included in such modules. Such a design is highly undesirable and perhaps infeasible given current standard module pin counts. Alternatively, a faster microprocessor within the optics module of an OLT may be used to compute signal strengths, but the increased cost of such an alternative is also undesirable.

Accordingly, it is desirable to provide devices and methods that estimate the received signal strength of an upstream data burst from an ONU in a PON faster than presently possible, while avoiding the undesirable affects described above.

SUMMARY

The following presents a summary of the disclosed subject matter in order to provide a basic understanding of some aspects of the disclosed subject matter. This summary is not an exhaustive overview of the disclosed subject matter, nor is it intended to identify key or critical elements of the disclosed subject matter or to delineate the scope of the disclosed subject matter. Its sole purpose is to present some concepts in simplified form as a prelude to the more detailed description which follows.

In some embodiments, a device for estimating the received signal strength of an optical signal is provided. Such a device may comprise OLT, where the OLT comprises an optics module operable to receive and amplify one or more optical data bursts, and a processing module operable to detect one or more bit patterns associated with each of the received, amplified optical data bursts during an amplifier recovery time period of an amplifier associated with each data burst and estimate a signal strength from the detected bit patterns for each of the data bursts.

The processing module (e.g., a field-programmable gate array (FPGA) or an application-specific integrated circuit (ASIC)) may comprise a signal strength detection section for detecting the one or more bit patterns. In embodiments, the processing module and/or optics modules (e.g., FPGA or ASIC) may include a plurality of hardware pins (e.g., pins on a hardware connector), however, the plurality of pins does not include a pin (or pins) dedicated to signal strength estimates. This reduces the required pin count of the optics module and/or processing module, or frees up pins to be used for other functions. For example, many times the optics module of an OLT is connected to the processing module via an electrical/electronic connector, where the connector includes a fixed number of pins depending on the form factor of the optics module and where each pin has a defined function. By eliminating the need for a dedicated pin for estimating a received signal strength the number of pins may be reduced or, alternatively, the pin that would typically be dedicated to a signal strength estimate can be used for other functions/purposes.

Processing modules provided by embodiments of the invention may be further operable to store signal strength calibration referential data corresponding to an amplifier that is a part of the OLT, and still further operable to access the calibration referential data to estimate the signal strength for each data burst it receives from an ONU during a recovery time period of the amplifier.

Yet further, in order to estimate a received signal strength a processing module provided by an embodiment of the invention may be operable to determine whether a detected bit pattern corresponds to a valid bit pattern by comparing the pattern to a stored bit mask, wherein a valid bit pattern comprises consecutive identical bits or a pattern that has bit errors below a threshold. Upon estimating a received signal strength, the processing module (or another part of the OLT or a separate hardware element specifically programmed to operate as follows) may be operable to compute an average signal strength based on the estimated signal strength(s) in order to reduce variations due to noise.

In embodiments of the invention, the estimation of a received signal strength may take into consideration the operating characteristics of a given ONU, for example. Because a laser within an ONU may not be fully disabled following the transmission of a burst of data, erroneous bits may be transmitted during the time it takes the laser to fully turn off. In an embodiment, such erroneous bits may optionally be skipped when determining a received signal strength. Accordingly, processing modules provided by embodiments of the invention may be operable to store one or more selectable, variable values where each value corresponds to a time period during which the processing module is operable to delay the detection of the bit pattern to take into account such a laser turn-off time period. In some embodiments, this value may be stored in the processing module or in a separate hardware memory. Each of the selectable, variable values may comprise a pre-determined value based on characteristics of a given ONU type, ONU manufacturer, or laser of a given ONU.

In addition to the devices described above, the present invention provides exemplary methods for estimating the received signal strength of an optical signal. One such method comprises receiving and amplifying one or more optical data bursts, and detecting one or more bit patterns associated with each of the received, amplified optical data bursts during an amplifier recovery time period of an amplifier associated with each data burst and estimating a signal strength from the detected bit patterns for each of the data bursts. Further, the method may comprise determining whether the bit pattern corresponds to a valid bit pattern by comparing the pattern to a stored bit mask, wherein a valid bit pattern comprises consecutive identical bits or a pattern that has bit errors below a threshold.

The reception, amplification, detection and estimation may be completed by an OLT, for example. Further, the method may comprise detecting the one or more bit patterns using a signal strength detection section of a processing module, where, again, the processing module may comprise a FPGA or ASIC.

In exemplary methods provided by the present invention, the reception, amplification, detection and estimation of a received signal strength may be completed without using a pin within an OLT dedicated to a signal strength estimate.

In addition to the steps described above, the exemplary method may comprise storing signal strength calibration referential data corresponding to an amplifier, and accessing the calibration referential data to estimate the signal strength for each data burst during a recovery time of an amplifier, computing an average signal strength based on the estimated signal strength(s) to reduce variations due to noise, and storing one or more selectable, variable values where each value corresponds to a time period during which the detection of a bit pattern may be delayed. Each of the selectable, variable values may comprise a pre-determined value based on characteristics of a given ONU type, ONU manufacturer, or laser of a given ONU.

The present disclosure may be better understood, and its numerous features and advantages made apparent to those skilled in the art by referencing the accompanying drawings.

DETAILED DESCRIPTION, INCLUDING EXAMPLES

Figure 1:
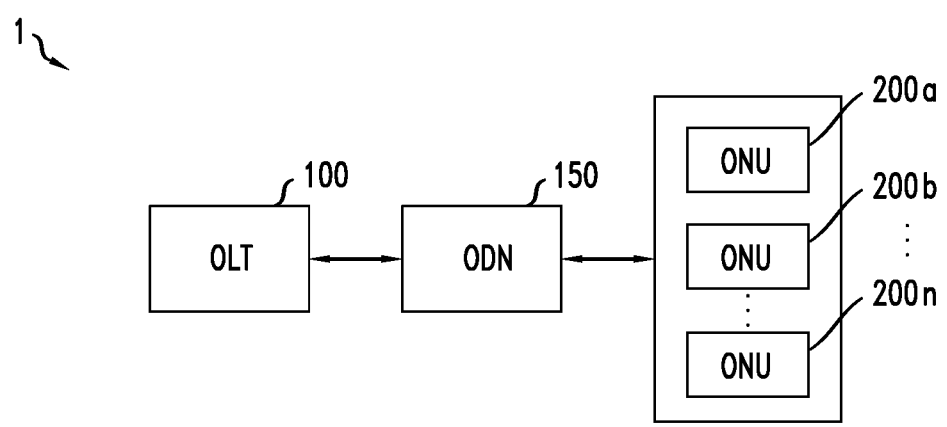
FIG. 1 depicts a simplified block diagram of a passive optical network according to an exemplary embodiment.

Exemplary embodiments for estimating the received signal strength of an optical signal are described herein and are shown by way of example in the drawings. Throughout the following description and drawings, like reference numbers/characters refer to like elements.

It should be understood that, although specific exemplary embodiments are discussed herein, there is no intent to limit the scope of the present invention to such embodiments. To the contrary, it should be understood that the exemplary embodiments discussed herein are for illustrative purposes, and that modified and alternative embodiments may be implemented without departing from the scope of the present invention. Said another way, the exemplary embodiments presented herein are only some of the many that fall within the scope of the present invention, it being practically impossible for the inventors to describe all of the many possible, exemplary embodiments and variations that fall within the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in the description of the process/method.

As used herein, the term "and/or" includes any and all combinations of one or more of the associated listed items. As used herein, the singular forms "a," "an" and "the" are intended to include the plural form, unless the context indicates otherwise. It should be further understood that the terms "comprises", "comprising,", "includes" and/or "including", when used herein, specify the presence of stated features, steps, operations, elements, and/or components, but do not preclude the presence or addition of one or more other features, steps, operations, elements, components, and/or combinations thereof.

When used herein the terms "detect", "compare", "count", "receive", "estimate", "access", "store", "determine", "compute", "output" and "input" and "amplify" and their many tenses are functions that may be completed by a hardware device, such as an inventive OLT described herein, modified to complete the features and functions of embodiments of the invention described herein.

As used herein the phrases "connector", "connected to", or similar phrases means a physical connecting device between at least two different elements or components, or means one element or component of a device is subsumed within (and thereby connected to) at least one other element or component of a device. It should be understood that when one element or component is described or depicted as being connected to another element or component, other elements or components used to facilitate such a connection may not be described or depicted in a figure because such elements or components are well known to those skilled in the art.

Still further, it should be understood when one element or component of a device is described or depicted as being connected to another element or component using "a connection" (or single line) in a figure it should be understood that practically speaking such a connection (line) may comprise (and many times will comprise) more than one physical connection or channel, may be omni-directional or bi-directional, and may or may not include separate data, formatting and signaling.

It should be noted that the devices, as well as any elements or components, etc., thereof, illustrated in the figures are not drawn to scale, are not representative of an actual shape or size and are not representative of any actual device layout, or manufacture's drawing. Rather, the devices are drawn so as to help explain the features, functions and processes of various exemplary embodiments of the present invention.

A used herein the word "memory" includes a hardware device (e.g., a non-transitory computer readable medium) for storing accessible data, signaling and/or instructions.

As used herein, the term "processing module" includes, but is not limited to, the inventive elements and components described herein, and may include a non-transitory computer readable medium for storing data, signaling and/or a set of instructions for completing the functions and features described herein.

As used herein the word "embodiment" refers to an example of the present invention.

Referring to FIG. 1 there is depicted a passive optical network 1 according to an exemplary embodiment. The exemplary PON 1 may comprise an OLT 100 and one or more ONUs 200a to 200n (where "n" indicates the last ONU), each ONU 200a-200n being connected to the OLT 100 by an associated optical data network 150. It should be understood that each of the ONUs 200a-200n may be operable to service a plurality of end user devices (not shown in FIG. 1). It should also be understood that while only a single OLT 100 is depicted in FIG. 1, that this is merely exemplary. In alternative embodiments, the PON 1 may comprise a plurality of OLTs, each being connected to (or responsible for communicating with) a plurality of ONUs. Together, the OLTs may comprise an intelligent, telecommunications services access management system, for example. It should be understood that the OLT 100 may be operable to exchange data with the ONUs 200a-200n at gigabit speeds (i.e., so the PON 1 may be a Gigabit PON, or GPON for short).

In one embodiment, the OLT 100 and ONUs 200a-200n may operate as follows. A control section of the OLT 100, such as the processing module 120 (see FIG. 3) may be operable to assign a timeslot to each of the ONUs 200a to 200n. During the respective timeslot assigned to a particular ONU 200a to 200n, the particular ONU 200a to 200n may be operable to transmit a plurality of upstream data bursts $s_1$ to $s_n$ (where "n" is a last data burst or signal) to the OLT 100.

In the downstream direction, the OLT 100 (e.g., processing module 120) may be operable to periodically transmit a stored bandwidth map to each of the ONUs 200a to 200n. An exemplary bandwidth map may contain the start times and burst length information for each of the ONUs 200a to 200n, which each of the ONUs 200a to 200n may utilize to transmit one or more upstream data bursts Si to $s_n$ to OLT 100 via network 150.

Figure 2:
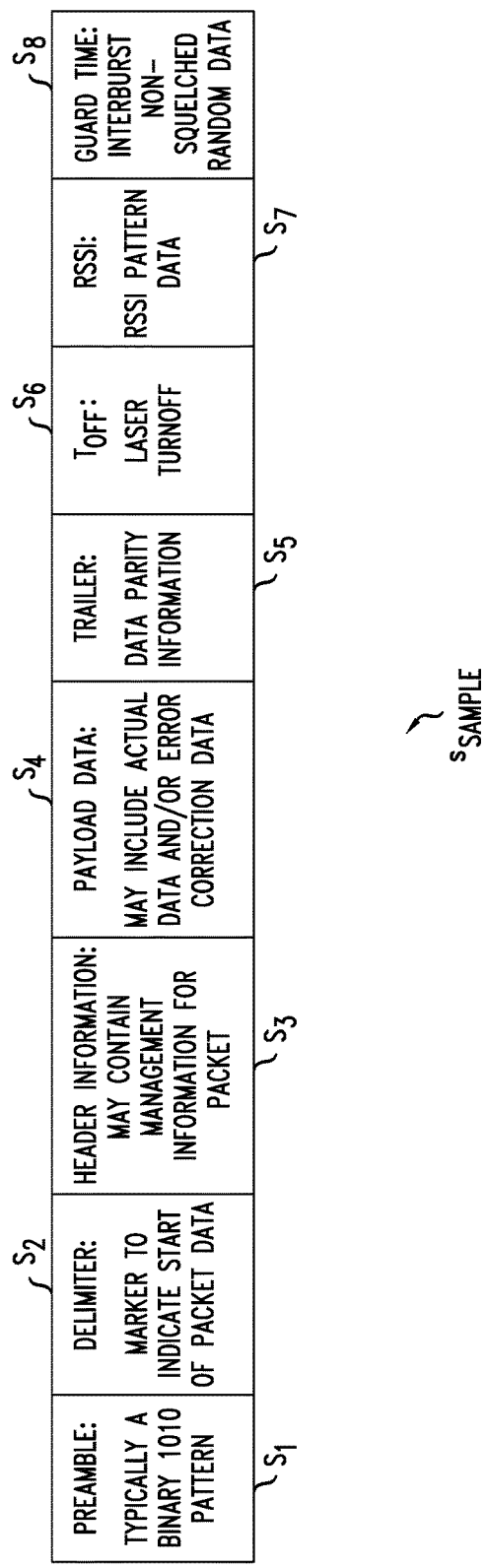
FIG. 2 depicts an exemplary data burst that may be received by an OLT

FIG. 2 illustrates an exemplary upstream data burst or signal $s_{sample}$ that may be received by the OLT 100 from one of the ONUs 200a to 200n. As depicted, the data burst $s_{sample}$ may comprise a single "packet" (upstream data burst) comprised of exemplary sections $s_1$ to $s_8$ though it should be understood that the signal $s_{sample}$ may comprise a plurality of similar packets, and more or less sections. The first section may be a preamble section $s_1$ that comprises a repeating pattern of logical bits (e.g., '10'). This pattern may be used to align detection circuitry within the OLT 100 (see the discussion of element 142 elsewhere herein) to the data burst $s_{sample}$ in order to correctly detect actual data (referred to herein as "packet data") within the burst $s_{sample}$ that follows the preamble section.

Subsequent to the preamble section $s_1$, a delimiter section $s_2$ may be included. The delimiter section $s_2$ may comprise a desired or, alternatively a predetermined, pattern of logical bits that function to separate the preamble section $s_1$ and the packet data sections. The packet data sections may include a header information section $s_3$, a payload data section $s_4$ and a trailer section $s_5$. The header information section $s_3$ may comprise bits that are used to manage or process the packet, the payload data section $s_4$ may comprise the information (e.g., content) being transmitted from an ONU 200a to 200n to the OLT 100, while the trailer section $s_5$ may comprise parity bits that may be used by the OLT 100 to detect and correct bit errors that may be present within the packet.

The data-burst may further include a section $s_6$ comprising bits associated with a laser turn-off time period, $T_{off}$ (collectively "laser turn off" or "hold off" time period). Such a time period corresponds to a period during which a laser within an ONU 200a to 200n has not been fully disabled following the transmission of packet data. As described elsewhere herein, the bits within the $T_{off}$ time period may optionally be skipped when determining a received signal strength. After the $T_{off}$ bits the packet may include a section $s_7$ that may comprise a plurality of bits that form one or more received signal strength indication (RSSI) bit patterns. As described further herein, the RSSI bit patterns are used to compute a received signal strength. Though these bits are normally included in a guard time period 58, in embodiments of the invention they are considered separately.

Figure 3:
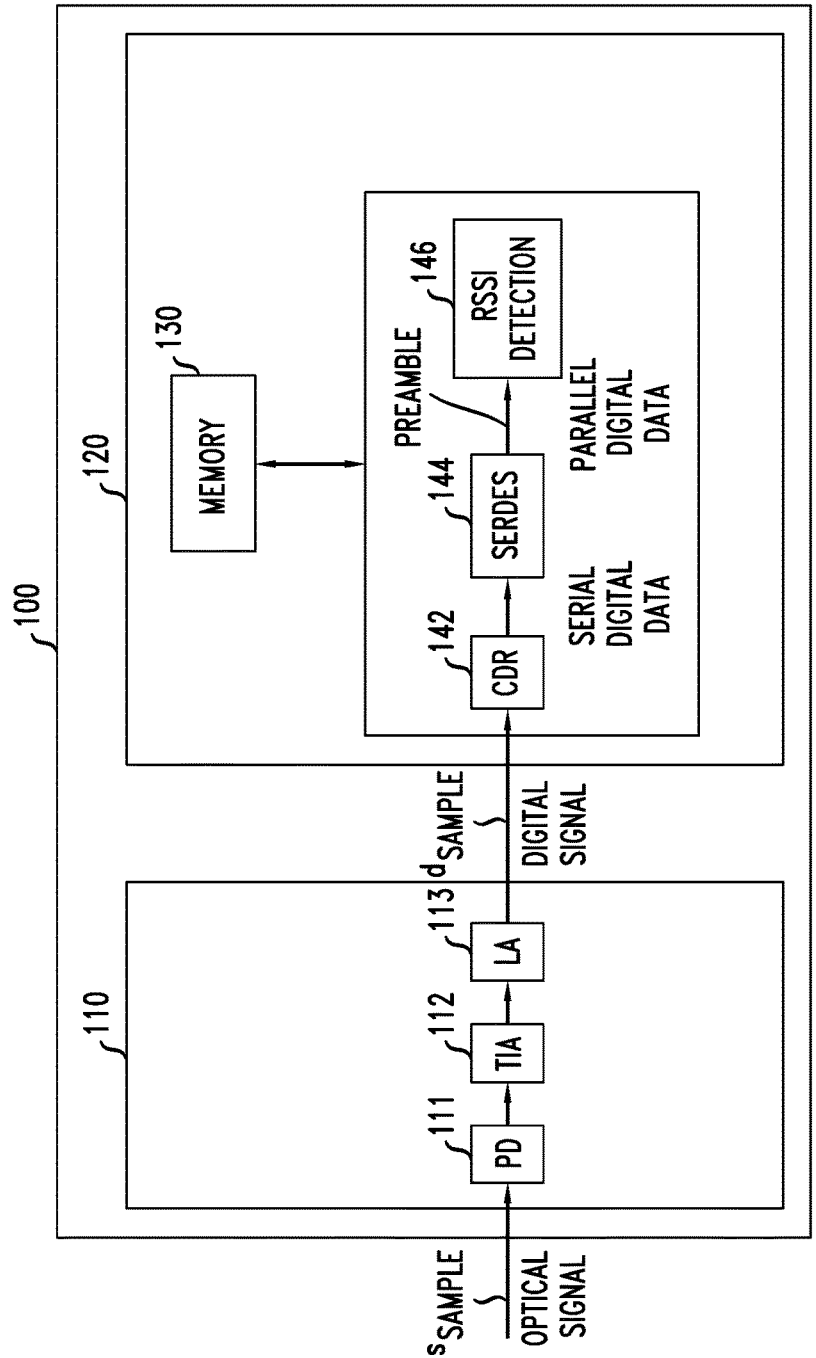
FIG. 3 illustrates a simplified block diagram of an exemplary OLT included in a PON according to exemplary embodiments.

Referring to FIG. 3 there is depicted a more detailed view of the exemplary, inventive OLT 100 shown in FIG. 1 according to an embodiment. As shown, the OLT 100 may include an optics module 110 and a digital processing module or digital chip 120 (e. g., an FPGA or ASIC) ("processing module" for short). In an exemplary operation, the optics module 110 may be operable to receive the optical data burst as a signal $s_{sample}$ from one of the ONUs 200a to 200n.

In an embodiment, the optics module 110 may further include a photo-detector (PD) 111, a trans-impedance amplifier (TIA) 112, and a limiting amplifier (LA) 113, for example.

The photo-detector 111 may be operable to receive the analog optical signal, $s_{sample}$, (e.g., data burst) and output it to the TIA 112. In an embodiment, the TIA 112 and the LA 113 may be operable to amplify the analog signal and output an amplified, digitized signal $d_{sample}$ to the processing module 120.

As mentioned previously, a number of upstream data bursts may be sent from the ONUs 200a to 200n to the OLT 100. During the time between each data burst, there is typically no optical signal to drive the photo detector 111 of OLT 100. During such a time period, the output of the TIA 112 typically oscillates in an unpredictable random manner. Accordingly, the LA 113 may be operable to squelch, or not squelch during this time period. In an embodiment, when the LA 113 is set to a squelch mode the output is fixed to a constant logical value, typically logical '0' until the LA 113 determines the TIA 112 is outputting data from a valid optical signal again. Conversely, when the LA 113 is set to not squelch, the LA 113 is operable to pass the amplified output of the TIA 112 no matter if a valid optical signal is output or not. In an embodiment of the invention, the LA 113 is operable so that it does not squelch. This is referred to herein as un-squelched, non-squelched, or a random noise output of the amplifier LA 113.

Continuing, a clock and data recovery (CDR) unit 142 (within the processing module 120) may be operable to receive the non-squelched, amplified, digitized signal $d_{sample}$ from LA 113 as a serial stream of data bits and perform clock data recovery on the data bits within signal $d_{sample}$ to align a local reference clock of the OLT 100 with a phase and frequency of the digital signal $d_{sample}$. Thereafter, the data stream may be sent to an exemplary Serializer/Deserializer (SERDES) unit 144. The SERDES unit 144 may be operable to convert a serial data bit stream to parallel data bit streams, for example.

In more detail, the CDR 142 may be operable to receive the amplified signal $d_{sample}$ from LA 113 and extract data from the digitized signal $d_{sample}$. Thereafter, the CDR 142 may be operable to align the phase (i.e., by locating edges of the transition from a logical "1" bit to a logical "0" bit, or from a logical "0" bit to a logical "1" bit) of the data bits within signal $d_{sample}$ with an internal reference clock so that the serial digital data bits within signal $d_{sample}$ may be formatted into parallel streams of digital data bits by SERDES unit 144. The SERDES unit 144 may be operable to convert such serial digital data bits into parallel digital data bits by, for example, grouping the serial data bits in 32 bit groups (i.e., "words", each word containing 32 bits). Thereafter, the SERDES unit 144 may be further operable to transmit the groups to a RSSI pattern detection section 146 over a 32 bit wide parallel bus, $p_{sample}$ for example, though it should be noted that the foregoing explanation is merely one example of the present invention. As explained in more detail below, in accordance with an embodiment of the invention, the RSSI pattern detection section 146 may be operable to receive the groups and estimate a received signal strength of the signal $s_{sample}$ (i.e., signal strength of the data burst) based on such received groups, for example.

Backtracking somewhat, in one embodiment the LA 113 may be configured to operate using detection thresholds (otherwise known as a "slicing levels") for detecting logical '1' or logical '0' bits. As is known in the art, the LA 113 may output erroneous bits (e.g., output a logical "1" bit instead of a logical "0" bit) referred to as bit errors if the amplification provided by the TIA 112 is too high or too low. For example, during a so-called post-burst settling time, which may occur at the end of an upstream data burst signal $s_{sample}$, the output of the TIA 112 may be a very low amplitude analog signal which may be interpreted as all logical '0' bits by the LA 113. In such an instance, in order to receive the data bits accurately (without bit errors) the LA 113 may comprise automatic gain control (AGC) circuitry that is operable to adjust the gain of the LA 113 in order to adjust its detection threshold until the detection threshold is centered between a logical "1" level and a logical "0" level of the random noise output of the TIA 112 The time period that elapses between the time the data bits within signal $s_{sample}$ have been fully received and processed by OLT 100 and the time that the LA 113 has adjusted its gain in order to compensate for random noise output by TIA 112 is referred to as the "amplifier recovery time period". In an embodiment, the amplifier recovery time period may comprise a time period associated with section $s_7$ of data burst $s_{sample}$ in FIG. 2 and, optionally section $s_6$. As described in elsewhere herein $s_6$ comprises a time period where a laser within an ONU 200a to 200n has not fully turned off, and thus may not be considered as part of an upstream data burst and, accordingly, may be optionally skipped over and not counted as a part of an RSSI bit pattern.

As discovered by the present inventors, the amplifier recovery time period is proportional to the input optical signal strength of a data burst.

In an embodiment of the invention, the RSSI detection section 146 of the processing module 120 may be operable to detect bits within a data burst, such as bits in section $s_7$ in data burst $s_{sample}$ in FIG. 2, that correspond with one or more patterns during an amplifier recovery time period. In an embodiment, the number of detected, corresponding patterns (i.e., a "count") may be used to estimate the signal strength of the data burst $s_{sample}$. Because the length of an amplifier recovery time period may vary from amplifier to amplifier, so too may the number of patterns that are counted and, thereafter, used to estimate a signal strength. In one example, such a pattern may comprise a plurality of consecutive "0" logical bits, while in another such a pattern comprises a plurality of consecutive "1" logical bits to name just two examples of such a pattern. More particularly, the RSSI detection section 146 may be operable to detect one or more consecutive logical bits having the same value (e. g., 0) in the parallel, digital stream $p_n$ that substantially occur during an amplifier recovery time period. In an embodiment, to detect a bit or bits corresponding to the beginning of the amplifier recovery time period the detection section 146 may be operable to detect a bit, bits or bit transition that corresponds to the end of a hold-off time period (e.g., $s_6$) described herein, for example, while to detect the end of the recovery time period the detection section 146 may be operable to detect a variable number of bits or bit transitions that correspond to an invalid bit pattern. In more detail, variations in the operating condition of the optics module 110 due to changes in operating voltages, system noise and different environmental conditions (e.g., operating temperatures) may result in invalid bits or additional or fewer bit transitions being present within a data stream, effectively lengthening or shortening a recovery time period between successive bursts from the same ONU 200a to 200n. Accordingly, the ability to vary the number of bits or bit transitions the detection section 146 must detect before determining an end to a given recovery time period allows the detection section 146 to accommodate such different operating and/or environmental conditions allowing a more precise measurement of the amplifier recovery time period.

In an embodiment, the detection section 146 may be operable to detect a group of bits within a data burst (e.g., every 32 bits), such as bits in section $s_7$ in data burst $s_{sample}$ that correspond with one or more valid patterns by comparing the detected bits to a stored bit mask. Each time a group of bits (again, 32 bits for example) forms a pattern that compares favorably to a bit mask (e.g., matches the bit mask or contains a number of corrupted bits less than or equal to a threshold number) the pattern is recognized by the detection section 146 as a valid pattern and is counted (e.g., a counter within section 146 may be incremented, for example). In an embodiment, the detection section 146 may be operable to store a plurality of different bit masks where each bit mask may allow for a different number of corrupted bits (i.e., the threshold number of corrupted bits may change). Alternatively, the bit masks may be stored in memory 130. Conversely, if a detected pattern does not compare favorably (e.g., does not match or contains a number of bits greater than a threshold) the detection section 146 is operable to determine that the pattern is an invalid pattern and, in addition, determine that the recovery time period has ended.

For example, in a simplified example, the detection section 146 may be operable to detect 8-bit bytes, and compare each byte to a stored bit mask having a threshold of two corrupted bits (or transitions). Thus, if the detection section 146 detects the following 8 bit byte "00000000" it will be detected as a valid pattern and counted. (e.g., a counter within section 146 is incremented). Similarly, an 8 bit byte of "01001000" will be detected as a valid pattern and counted because the number of corrupted bits (e.g., two logical "1"s) is less than or equal to 2. However, the following 8 bit byte will not be counted because the detection section 146 will be operable to detect that it contains a number of corrupted bits (e.g., 3 logical "1" bits) that are greater than the threshold: 01010100.

Once the detection section 146 has detected an invalid bit pattern the counting of such patterns is halted and the stored count may then be compared to calibration referential data stored in the detector section 146 or memory 130, for example, in order to convert the count into an estimate of the received signal strength of the data burst $s_{sample}$.

The ability to determine a received signal strength based on logical bit patterns associated with an amplifier recovery time period allows devices provided by the present invention (e.g., OLTs) to measure received signal strengths on a burst-by-burst basis for every upstream data burst from every ONU 200a to 200n, if desired. In contrast, existing received signal strength estimates are based on measurements of less than one percent of all upstream data bursts sent from ONUs 200a to 200n.

Figure 4:
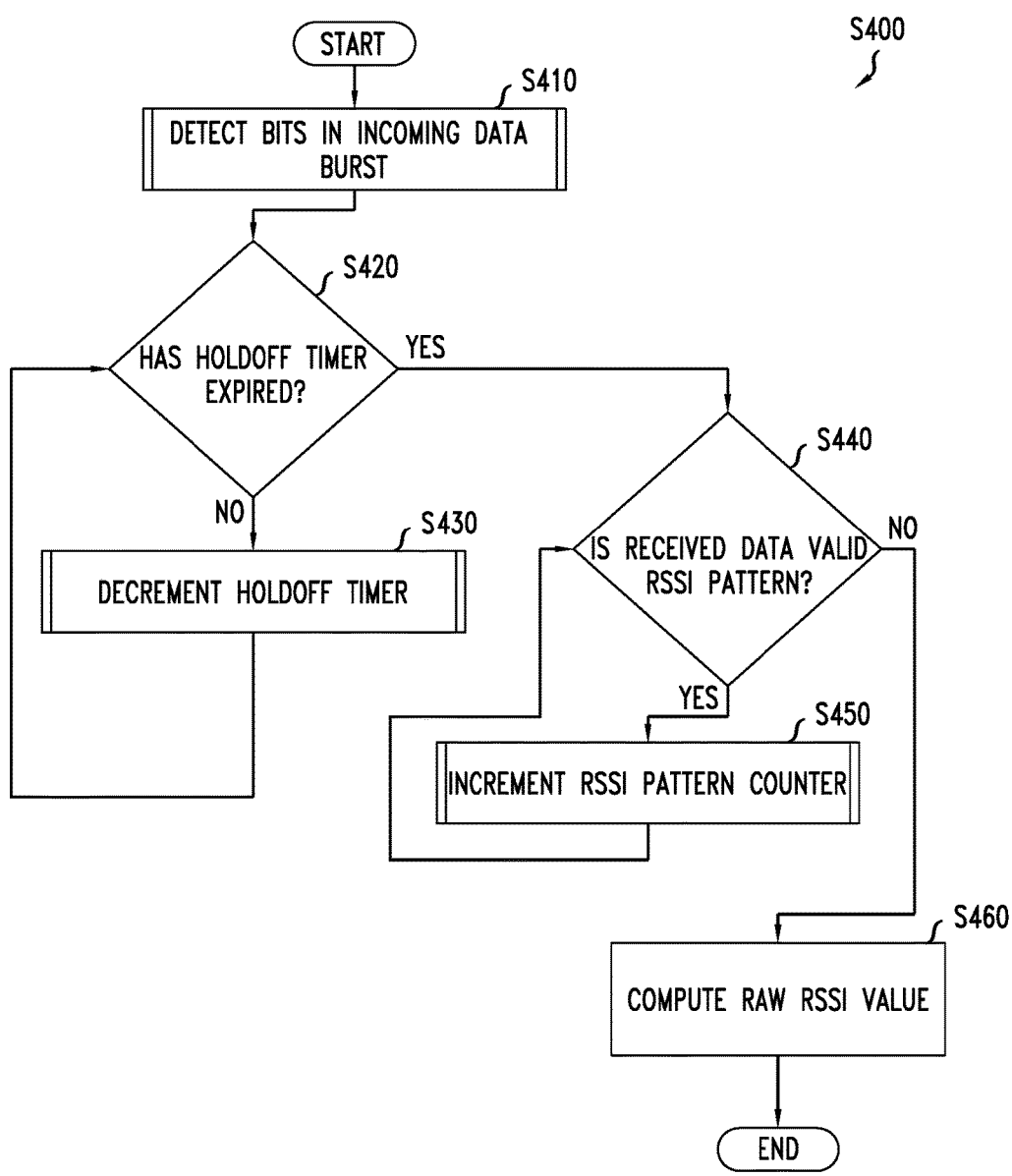
FIG. 4 illustrates a simplified flow chart of method of estimating a received signal strength according to exemplary embodiments.

Referring now to FIG. 4, there is shown an exemplary flow chart of a method for estimating the signal strength of a data burst. The RSSI detector section 146 may be operable detect bits within an incoming data burst that indicates the end of burst data 55 in step 410. In an embodiment, the detection section 146 may be operable to store one or more (i.e., a plurality) selectable, variable values as a hold-off timer, where each value corresponds to a time period $s_6$ during which the detection section 146 may be operable to delay the start of the detection of bits and bit patterns that will be used to estimate a signal strength. This stored holdoff timer (i. e., value) and corresponding time period allows the detection section 146 to, in effect, ignore the logical bits and transitions that are not related to a RSSI bit pattern. Such unrelated bits and transitions may be related to the laser turn-off time period ($T_{off}$) described previously, for example.

In an embodiment, the value of the stored holdoff timer may comprise a pre-determined value that may be determined based on the characteristics of a given ONU type and/or ONU manufacturer (i.e., a given laser). It should be understood that the detection section 146 may be operable to store one or more of such values, where each value may be associated with a given ONU, ONU type or laser type, for example.

Continuing, when the detection section 146 determines that the hold-off timer (value) has expired in step 420, the section 146 may be operable to begin detecting and counting (collectively "detecting") bits (e.g., bits in section $s_7$ of FIG. 2) that it detects following the expiration of the timer and determine whether such bits correspond to a valid bit pattern in step 440, by comparing the pattern to a bit mask, for example. As indicated previously, in an embodiment, a valid bit pattern may comprise consecutive identical bits (e.g., all logical '0' or logical '1') or may comprise a pattern that has bit errors below a threshold, for example. If the hold-off timer has not expired, the detection section 146 may adjust (e.g., increment, decrement) the value of the timer in step 430.

In an embodiment, each time a group of valid 32 bits (sometimes referred to as a "word") are detected the detection section 146 may be operable to increment a pattern counter stored in section 146, in step 450, for example. By incrementing the pattern counter each time a group of valid 32 bits is detected, the section 146 may be operable to count the number of valid 32 bit patterns that are detected during a recovery time period.

Upon detection of an invalid bit pattern the section 146 may be operable to cease incrementing, for example, of the pattern counter. Thereafter, in an embodiment, the detection section 146 may be operable to access signal strength, calibration referential data stored by the section 146 in a one or more look-up tables, for example. Each look-up table may comprise signal strength, calibration referential data that corresponds to a given amplifier (e.g., LA 113), operating conditions and/or operating environments for example. In more detail, it should be understood that a given optics module 110 may contain different components (different amplifiers, LA 113 and TIA 112 for instance) having different operating characteristics. Accordingly, such different components may result in the output of additional or fewer bit transitions, effectively lengthening or shortening a recovery time period (i.e., the amplifier settles faster or slower) for a given signal strength. In order to accommodate these different components, in embodiments of the invention an inventive OLT (e.g., OLT 100) may include one or more stored lookup tables where each table may comprise stored, referential data which corresponds to the characteristics of a given variant of an optics module. Such a table may be used to convert an estimated count to a calibrated received signal strength value. In sum, OLTs provided by the present invention (e.g., OLT 100) may be operable to store signal strength, calibration referential data associated with a number of different amplifiers, operating conditions and operating environments.

In an embodiment, the RSSI detection section 146 may be operable to map the value of the stored, pattern count to the accessed, signal strength referential data that corresponds with the appropriate amplifier (e.g., LA 113), in effect, converting the value of the stored pattern count to an estimated signal strength (e.g., a "raw" received signal strength value measured in micro-watts), for example, in step 460. In an embodiment, the value of an estimated signal strength may also be stored in the detection section 146 (e.g., in a register) or in a separate memory 130, for example, If desired, the processing module 120 (or another element of OLT 100) may be operable to estimate a plurality of such signal strengths and then compute an average signal strength based on the estimated signal strengths to reduce variations due to noise.

As discussed herein, inventive devices, such as OLTs, may be operable to estimate a received signal strength of a data burst from an ONU based on the detection of valid bit patterns during an amplifier recovery time period. The signal strengths provided by embodiments of the present invention are more accurate and can be estimated more frequently than existing techniques. This allows the operator of a PON or GPON to monitor the operational health of individual ONUs as well as the status of optical fibers and cables connecting the ONUs to an OLT, for example.

Yet further, OLTs provided by the present invention need not include a trigger pin to estimate received signal strengths, thus reducing the required pin count of the optics module and/or processing module (e.g., ASIC). For example, many times the optics module of an OLT is connected to the processing module via an electrical/electronic connector, where the connector includes a fixed number of pins depending on the form factor of the optics module and where each pin has a defined function. By eliminating the need for a dedicated RSSI trigger pin, the number of pins may be reduced or, alternatively, the pin that would typically be dedicated to signal strength estimates can be used for other functions/purposes. In an embodiment, an exemplary processing module (e.g., ASIC) may be operable to receive a plurality of data bursts from a number of PON ports. Conventionally, each of these PON ports may have a dedicated pin for estimating a received signal strength (an RSSI trigger pin). However, in accordance with embodiments of the invention, each of these pins may be eliminated or used for other functions. Thus, a plurality of pins (e.g., 4 to 8 pins) may be eliminated or freed up to be used for other functions/purposes.

It should be understood that although the inventive concepts have been described with reference to specific embodiments, one of ordinary skill in the art will appreciate that various modifications and changes can be made without departing from the scope of the present disclosure as set forth in the claims below. Accordingly, the specification and figures are to be regarded in an illustrative, rather than a restrictive sense, and all such modifications are intended to be included within the scope of the present disclosure. Further, the benefits, other advantages, and solutions to problems described herein with regard to specific embodiments are not to be construed as a critical, required, or essential feature of any or all the claims. Accordingly, the protection sought herein is as set forth in the claims that follow.

What is claimed is:

1. A device for estimating the received signal strength of an optical signal comprising:
    an optics module operable to receive and amplify one or more optical data bursts; and
    a processing module operable to detect one or more bit patterns associated with each of the received, amplified optical data bursts during an amplifier recovery time period of an amplifier associated with each data burst and estimate a signal strength from the detected bit patterns for each of the data bursts.

2. The device as in claim 1 wherein the device comprises an optical line terminal (OLT).

3. The device as in claim 1 wherein the processing module comprises a signal strength detection section for detecting the one or more bit patterns.

4. The device as in claim 1 wherein the processing module comprises a field-programmable gate array (FPGA) or an application-specific integrated circuit (ASIC).

5. The device as in claim 4 wherein the FPGA or ASIC comprises a plurality of pins, and the plurality of pins does not include a pin dedicated to signal strength estimates.

6. The device as in claim 1 wherein the processing module is further operable to store signal strength calibration referential data corresponding to the amplifier, wherein the processing module may be further operable to access the calibration referential data to estimate the signal strength for each of the data bursts.

7. The device as in claim 1 wherein the processing module is further operable to determine whether the bit pattern corresponds to a valid bit pattern by comparing the pattern to a stored bit mask, wherein a valid bit pattern comprises consecutive identical bits or a pattern that has bit errors below a threshold.

8. The device as in claim 1 wherein the processing module is further operable to compute an average signal strength based on the estimated signal strengths to reduce variations due to noise.

9. The device as in claim 1 wherein the processing module is further operable to store one or more selectable, variable values where each value corresponds to a time period during which the processing module is operable to delay the detection of the bit pattern.

10. The device as in claim 9 wherein each of the selectable, variable values comprise a pre-determined value based on characteristics of a given optical network unit (ONU) type, ONU manufacturer, or laser of a given ONU.

11. A method for estimating the received signal strength of an optical signal comprising:
    receiving and amplifying one or more optical data bursts; and
    detecting one or more bit patterns associated with each of the received, amplified optical data bursts during an amplifier recovery time period of an amplifier associated with each data burst and estimating a signal strength from the detected bit patterns for each of the data bursts.

12. The method as in claim 11 wherein the reception, amplification, detection and estimation is completed by an optical line terminal (OLT).

13. The method as in claim 11 further comprising detecting the one or more bit patterns using a signal strength detection section of an OLT.

14. The method as in claim 13 wherein the processing module comprises a field-programmable gate array (FPGA) or an application-specific integrated circuit (ASIC).

15. The method as in claim 11 further comprising completing the reception, amplification, detection and estimation of the received signal strength without using a pin within an OLT dedicated to signal strength estimates.

16. The method as in claim 11 further comprising storing signal strength calibration referential data corresponding to the amplifier, and accessing the calibration referential data to estimate the signal strength for each of the data bursts.

17. The method as in claim 11 further comprising determining whether the bit pattern corresponds to a valid bit pattern by comparing the pattern to a stored bit mask, wherein a valid bit pattern comprises consecutive identical bits or a pattern that has bit errors below a threshold.

18. The method as in claim 11 further comprising computing an average signal strength based on the estimated signal strengths to reduce variations due to noise.

19. The method as in claim 11 further comprising storing one or more selectable, variable values, where each value corresponds to a time period during which the detection of the bit pattern is delayed.

20. The method as in claim 19 wherein each of the selectable, variable values comprise a pre-determined value based on characteristics of a given optical network unit (ONU) type, ONU manufacturer, or laser of a given ONU.

* * * * *